United States Patent [19]

Shinkai

[11] Patent Number: 4,891,798
[45] Date of Patent: Jan. 2, 1990

[54] OPTICAL DISC PLAYER WITH FOCUS CONTROL FOR PREVENTING ERRONEOUS FOCUS ON OUTER SURFACE OF OPTICAL DISC

[75] Inventor: Mitsutoshi Shinkai, Kanagawa, Japan

[73] Assignee: Sony Corporation, Tokyo, Japan

[21] Appl. No.: 22,545

[22] Filed: Mar. 5, 1987

Related U.S. Application Data

[63] Continuation of Ser. No. 759,102, Jul. 25, 1985, abandoned.

[30] Foreign Application Priority Data

Jul. 25, 1984 [JP] Japan ................................ 59-154550

[51] Int. Cl.$^4$ .............................................. G11B 7/00
[52] U.S. Cl. ................................ 369/45; 250/201 AL
[58] Field of Search ............................ 369/43, 45, 46; 250/201 DF

[56] References Cited

U.S. PATENT DOCUMENTS

| | | | |
|---|---|---|---|
| 4,118,736 | 10/1978 | Okada et al. ........................ | 369/44 |
| 4,243,848 | 1/1981 | Utsumi ................................ | 369/45 |
| 4,346,471 | 8/1982 | Hirasawa et al. ..................... | 369/44 |
| 4,368,526 | 1/1983 | Harigae et al. ...................... | 369/45 |
| 4,418,405 | 11/1983 | Barnette et al. ..................... | 369/45 |
| 4,426,690 | 1/1984 | Motoyama ........................... | 369/45 |
| 4,512,003 | 4/1985 | Kimura et al. ........................ | 369/45 |
| 4,544,837 | 10/1985 | Tanaka et al. ........................ | 369/45 |
| 4,546,460 | 10/1985 | Ando .................................... | 369/45 |
| 4,561,080 | 12/1985 | Yamazaki .............................. | 369/45 |
| 4,603,412 | 7/1986 | Yamazaki .......................... | 369/43 X |
| 4,616,354 | 10/1986 | Tyoshida .......................... | 369/45 X |
| 4,633,458 | 12/1986 | Ogawa ............................. | 369/45 X |
| 4,654,515 | 3/1987 | Ando ................................ | 369/45 X |

Primary Examiner—Aristotelis M. Psitos
Attorney, Agent, or Firm—Lewis H. Eslinger; Jay H. Maioli; Donald S. Dowden

[57] ABSTRACT

An optical disc player in which prior to a focus servo control carried out by a focus control mechanism on the basis of an indication of a focus error signal, focusing control means causes an objective lens to approach to an optical disc so that a focused position of the beam light incident on the optical disc is brought on the signal recording surface or in the vicinity thereof, i.e., in a predetermined focusing range including a part of a high light reflectivity portion surrounding the signal recording surface. Consequently, the mode transfer to focus control operation by the focus control mechanism can be accurately carried out without an incorrect determination that the incident beam light on the optical disc has focused on an outer surface of the optical disc, i.e., of a transparent substrate or transparent protection layer having light reflectivity substantially equal to that of the signal recording surface.

1 Claim, 4 Drawing Sheets

OPTICAL DISC PLAYER WITH FOCUS CONTROL FOR PREVENTING ERRONEOUS FOCUS ON OUTER SURFACE OF OPTICAL DISC

This is a continuation of application Ser. No. 06/759,102, filed July 25, 1985 now abandoned.

BACKGROUND OF THE INVENTION

The present invention relates to an optical disc player which emits a beam light to focus on a signal recording surface of an optical disc, detects the light beam reflected on the disc, generates an electrical signal when the reflected beam light is detected, and adjusts a focused position of the light beam incident on the disc through a focus control mechanism of the optical disc player having focusing control means.

In an optical disc player which reproduces a signal recorded on a recording track of the optical disc which is formed of a signal recording surface by the use of a laser beam and/or records information by the use of the laser beam on the optical disc, a focus servo control is carried out to rotate the optical disc and to bring the laser beam to fall on the rotating signal recording surface of the optical disc in an appropriately focused state. The focus servo control is carried out with the focus servo control mechanism. The focus servo control mechanism, e.g., controls a position of an objective lens through which the laser beam focuses on the signal recording surface of the optical disc in a direction orthogonal to the signal recording surface of the optical disc so that a distance from the objective lens to the signal recording surface is adjusted, thus the focused position of the laser beam being placed and held appropriately on the signal recording surface of the optical disc.

In the above-described optical disc player, it is necessary to place the objective lens within a range of a predetermined distance therefrom to the signal recording surface of the optical disc and to place the focused position of the laser beam incident on the optical disc within a predetermined focusing range with respect to the signal recording surface of the optical disc immediately before the focus servo control is made in order to achieve an accurate focus servo control.

To establish a condition required for starting such an appropriate focus servo control the focus control mechanism of the optical disc player is provided with focusing control means. The focusing control means carries out a focusing operation such that the focused position of the laser beam incident on the optical disc is brought in so-called a just focused state, i.e., the focus is just on the signal recording surface of the optical disc or placed in a state relatively approximate to the just focused state, i.e., placed within the predetermined focusing range with respect to the signal recording surface of the optical disc. Thereafter, the focus servo control is followed.

However, since an operation mode transfer from the focusing operation state to the focus servo control state is carried out on the basis of a result of the reflected beam light, e.g., laser beam derived from the reflection of the laser beam incident on the optical disc, the transfer to the focus servo control mode is carried out with the focused position of the laser beam incident on the optical disc being not placed in the predetermined range with respect to the signal recording surface, in a case when a writable optical disc is used in which an user can record a signal optically on the recording surface and in which a land portion in a spiral form, having a relatively high light reflectivity and a groove portion in a spiral form, having a relatively low light reflectivity, and which is sandwiched between the mutually adjacent land portion are formed and a bottom surface of the groove portion is used as the signal recording surface. Otherwise, the transfer to the focus servo control mode is not carried out even though the focused position of the laser beam is placed in the predetermined focusing range.

In more details, if the above-described writable optical disc is used, a difference in the light reflectivity between the signal recording surface with respect to the incident laser beam and a transparent substrate on an outer surface of which the signal recording surface is formed or an outer surface of a transparent protection layer covering the substrate becomes minor. Therefore, during the focusing operation by means of the above-described focusing control means, it is difficult to determine whether the incident laser beam focuses on the outer surface of the transparent protection layer incident beam side or focuses on the signal recording surface of the optical disc. As a result of this, when the focused position of the incident laser beam is placed within a predetermined distance range with the outer surface of the optical disc at the incident side as a center, the transfer to the focus servo control mode is carried out with the incorrect determination of the focused position. Otherwise, if the optical disc player is set to avoid such an erroneous condition as described above, the player does not detect that the focused position of the incident laser beam is placed in its appropriately focused range and consequently does not carry out the transfer from the focusing mode to the focus servo control mode.

SUMMARY OF THE INVENTION

With the above-described disadvantage in mind, it is an object of the present invention to provide an optical disc player having a focus control mechanism by which an appropriate focusing operation can be assured and thus accurate servo control operation can be made even when a writable optical disc having a signal recording surface of a relatively low light reflectivity is used.

This can be achieved by providing an optical disc player, comprises: (a) first means for generating and emitting a beam light, (b) second means having a focal point at a predetermined distance therefrom for focusing the incident beam light from the first means toward an optical disc having a signal recording surface of a light reflectivity lower than a high light reflectivity portion surrounding the signal recording surface, (c) third means for traversing the beam light incident on the signal recording surface of the optical disc from the second means through the high light reflectivity portion of the optical disc, (d) fourth means for detecting the light beam reflected from the optical disc and outputting a first signal indicating a recorded information and a second signal indicating a focused state of the incident beam light on the optical disc from the second means, (e) fifth means for moving the second means along a light axis of the beam light toward the optical disc so as to place a focused position of the second means on the signal recording surface of the optical disc, (f) sixth means for detecting that the focused position of the incident beam light on the optical disc from the second means is placed within a predetermined focusing range including a part of the optical disc which is distinguishable from the parts other than the signal recording surface and high light reflectivity portion on the basis of indications of the first and second signals of the fourth means, and (g) seventh means for adjusting the focused position of the incident beam light on the optical disc on the basis of the indication of the second signal of the fourth means when the sixth means detects that the focused position of the incident beam light on the optical disc is placed within the predetermined range.

BRIEF DESCRIPTION OF THE DRAWINGS

A more complete understanding of the present invention may be obtained from the following description taken in conjunction with the attached drawings in which like reference numerals designate corresponding elements and in which.

DETAILED DESCRIPTION OF THE PREFERRED EMBODIMENT

Reference will hereinafter be made to the drawings in order to facilitate understanding of the present invention.

Figure 1A:
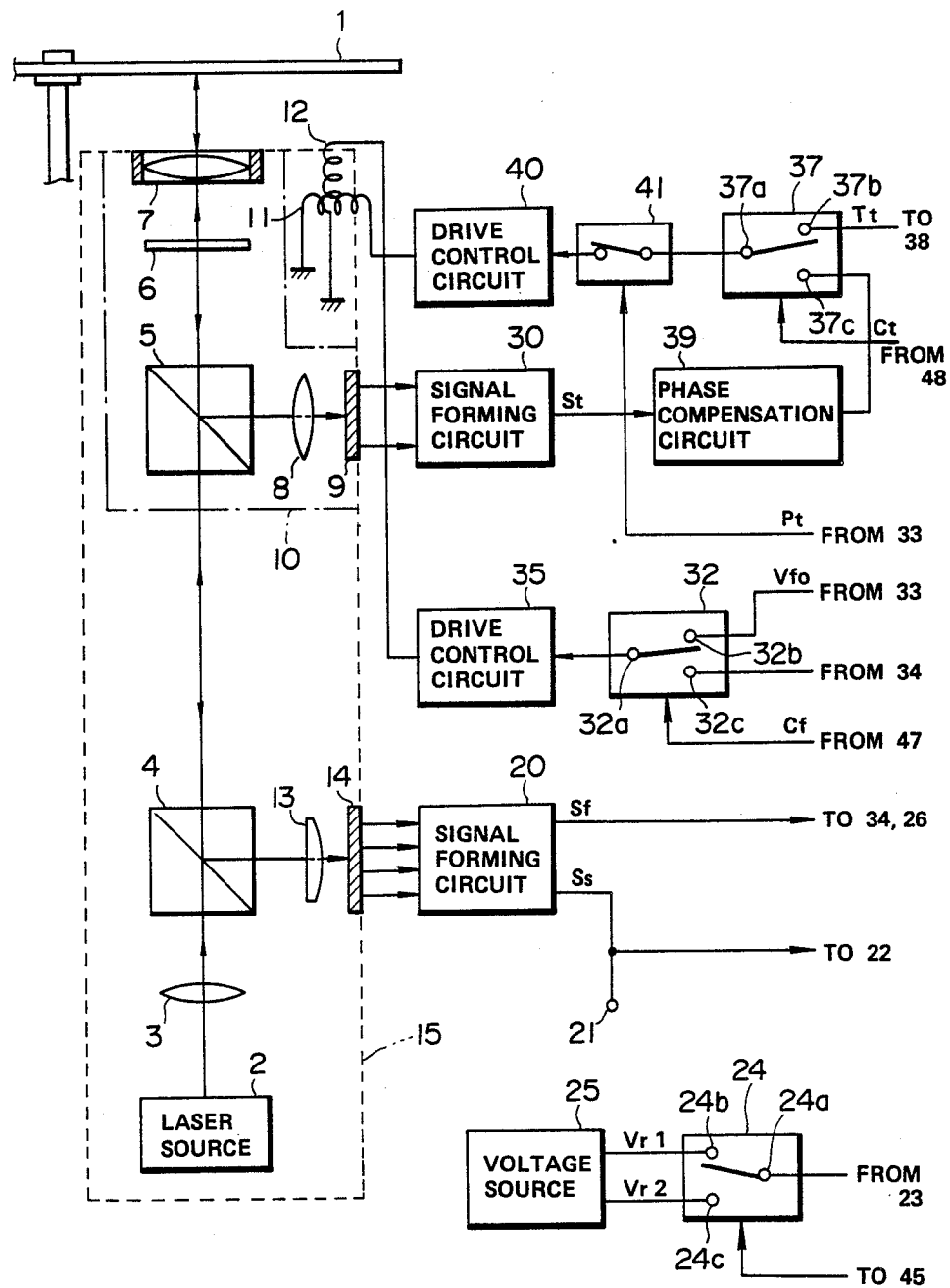
FIGS. 1(A) and 1(B) are integrally a simplified circuit block diagram of a preferred embodiment of an optical disc player according to the present invention.
Figure 1B:
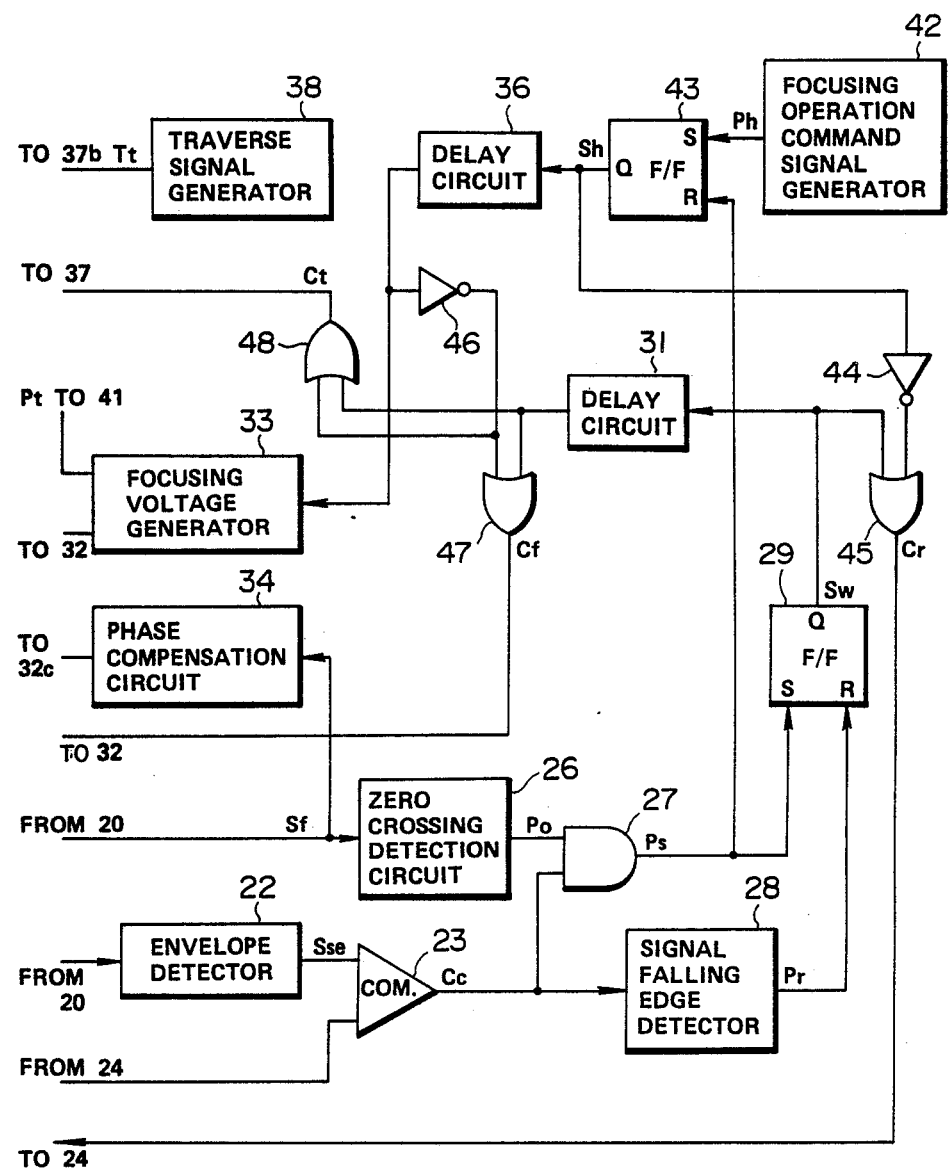

FIGS. 1(A) and 1(B) show an essential part of a preferred embodiment of an optical disc player according to the present invention.

Figure 2:
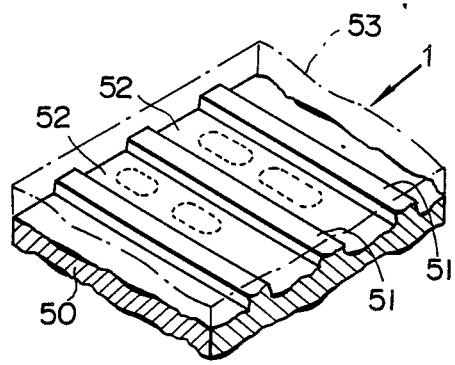
FIG. 2 is a partial perspective view of an optical disc applicable to the optical disc player shown in FIG. 1.

An optical disc 1 used in the embodiment shown in FIG. 1(A) comprises, as shown in FIG. 2, land portion 51 having a relatively high light reflectivity, formed spirally or concentrically on one of surfaces of a transparent substrate 50 made of, e.g., a plastic material, and groove portion 52 having a relatively low light reflectivity, partitioned with the land portion 51 and formed spirally or concentrically. The groove portion 52 serve as signal recording surface on which a user can optically record information signals and/or on which information signals are already recorded.

It should be noted that a transparent protection layer 53 is disposed over the land and groove portions 51, 52.

A laser beam normally reaches the signal recording surface, i.e., groove portion 52 via the transparent substrate 50. In addition, a reflectivity of an incident laser beam on the signal recording surface is relatively low and equal to or slightly higher than the reflectivity of the incident laser beam on the outer surface of the transparent substrate 50. The optical disc 1 is rotated at a predetermined rotational speed.

In FIG. 1(A), numeral 2 denotes a laser source comprising, e.g., a semiconductor laser.

The laser beam from the laser source 2 enters into beam splitters 4, 5 via a collimating lens 3. The laser beam passed through the beam splitters 4, 5 falls on an objective lens 7 via a quarter wavelength plate 6. The laser beam is focused by means of the objective lens 7 on the optical disc 1 via the outer surface of the transparent substrate 50. In this embodiment, an optical head 10 is formed integrally which comprises the beam splitter 5, quarter wavelength plate 6, objective lens 7, another lens system 8, and light receiving portion 9 to be described later. The optical head 10 is controlled in such a way that the position thereof is moved toward, for example, a direction in which the laser beam incident on the optical head 1 crosses the signal recording surface formed by the groove portion 52 of the optical disc 1 and a direction in which the optical head 10 approaches or separates to or from the optical disc 1.

The incident laser beam on the optical disc 1 is modulated and reflected on the signal recording surface. Thereafter, the reflected laser beam enters again on the objective lens 7 and beam splitter 5 via the quarter wavelength plate 6. A part of the beam is refracted toward a right side as viewed from FIG. 1(A) at the beam splitter 5. In addition, the other part of the beam is passed through the beam splitter 5 into the beam splitter 4 at which the beam is refracted toward a right side as viewed from FIG. 1(A).

The reflected laser beam refracted toward the right side by means of the beam splitter 5 arrives at the light receiving portion 9 via the lens 8.

The reflected laser beam refracted toward the right side by means of the beam splitter is used to detect a deviation of the incident laser beam which has reached a position of the optical disc 1 from a center position of one of the signal recording surface formed by the groove portion 52, i.e., to detect a tracking error. Furthermore, the incident laser beam refracted toward the right side by means of the beam splitter 4 reaches the light receiving portion 14 via the cylindrically shaped lens 13. This reflected laser beam is used to detect a focusing error in a non-focused state of the laser beam on the signal recording surface of the incident laser beam and to reproduce the signals on the signal recording surface.

The light receiving portion 9 and light detector 14 receive the reflected laser beam from the beam splitters 4, 5, respectively, and generate an electrical signal according to these changes. The laser source 2, beam splitters 4, 5, collimating lens 3, quarter wavelength plate 6, objective lens 7, lens system 8, light receiving portion 9, tracking adjustment actuation coil 11, focus adjustment actuation coil 12, lens 13, and light receiving portion 14 constitute an optical system 15.

The whole optical system 15 is moved integrally along a radial direction of the optical disc 1.

Electrical signals corresponding to the reflected laser beam from the light receiving portions 9 and 14 are sent to respective signal forming circuits 20 and 30. The signal forming circuit 30 forms a tracking error signal $S_t$ according to a deviation from a position of the optical system 15 at which the incident laser beam falls on a center of the signal recording surface formed by the groove portion 52 of the optical disc 1.

On the other hand, the signal forming circuit 20 forms a focus error signal $S_f$ according to a focused state of the incident laser beam with respect to the signal recording surface and forms an output signal $S_s$ which is a read signal component of an information recorded on the optical disc 1.

It should be noted that the focus error signal $S_f$ indicates, for example, zero when the focused position of the incident laser beam has just been placed on the signal recording surface, i.e., the incident laser beam is just focused, the focus error signal $S_f$ indicates a positive value (+) when the focused position of the incident laser beam is not on the signal recording surface but at a front portion of the signal recording surface nearer to the incident portion of the laser beam (i.e., in an over focused state), and the focus error signal $S_f$ indicates a negative value (−) according to the focused position when the focused position of the incident laser beam is not on the signal recording surface but at a rear portion of the signal recording surface far away from the incident portion of the laser beam (i.e., in an under focused state). The level change of the focus error signal $S_f$ indicating the negative value exhibits a curve in the form of letter of S. In addition, the output signal $S_s$ has a relatively low level under the over focused state or under focused state with respect to the signal recording surface. On the other hand, the output signal $S_s$ has a high level in a state relatively nearer to the just focused state or under the just focused state.

Together with the output signal $S_s$ supplied to a reproduction signal processing circuitry including a demodulator (not shown) via a terminal 21, the output signal $S_s$ is sent to an envelope detector 22. The envelope detector 22 then produces a signal $S_{se}$ having a level corresponding to an envelope level of the output signal $S_s$. The signal $S_{se}$ is sent to one input terminal of a level comparator 23. A reference input terminal of the level comparator 23 receives selectively one of first and second reference voltages $V_{r1}$ and $V_{r2}$ via a switch circuit 24. The first reference voltage $V_{r1}$ has such a level substantially equal to a level of the signal $S_{se}$ corresponding to a state in which the incident laser beam focuses on the land portion 51 having a relatively high reflectivity, i.e., on a high-reflectivity portion 51. In this case, the incident laser beam is in a state relatively near to the just focused state on the land portion 51. The second reference voltage $V_{r2}$ has such a level lower than that of the signal $S_{se}$ in a state wherein the incident laser beam focuses on the groove portion 52 having relatively low reflectivity on the optical disc 1, i.e., on the signal recording surface, i.e., the focused position of the incident laser beam is just in a focused state or relatively nearer to the just focused state. The level comparator 23 produces a comparision result $C_c$ in such a way that a constant high-level signal is outputted when the level of the signal $S_{se}$ exceeds either the level $V_{r1}$ or level $V_{r2}$ and a constant low-level signal is outputted when the level of the signal $S_{se}$ is lower than either the level $V_{r1}$ or level $V_{r2}$.

On the other hand, the focus error signal from the signal forming circuit 20 is sent to a zero-crossing detection circuit 26 in which a pulse $P_o$ having a high level is outputted when the focus error signal $S_f$ crosses zero.

The output signals from the zero crossing detection circuit 26 and level comparator 23 are sent to an AND gate circuit 27.

The AND gate circuit 27 takes a logical AND of the output signals $P_o$ and $C_c$ derived from the zero crossing detection circuit 26 and from the level comparator 23. That is to say, the AND gate circuit 27 outputs a high-level signal $P_s$ when both the pulse signal $P_o$ and high-level output signal $C_c$ are received. The output high-level signal $P_s$ is sent to a set terminal S of an R-S flip-flop circuit 29. A part indicated by numerals 22 through 27 shown in FIGS. 1(A) and 1(B) constitutes a detection part of the optical disc player which detects the incident laser beam focuses on the land portion 51 of the optical disc 1, i.e., high reflectivity portion or on the groove portion 52, i.e., the signal recording surface or in the vicinity of the recording surface.

A reset terminal R of the R-S flip-flop circuit 29 receives a signal $P_r$ from a signal falling edge detector 28. The signal falling edge detector 28 receives a comparison output signal $C_c$ from the comparator 23 and outputs a pulse $P_r$ which falls whenever the level of the comparison output signal $C_c$ changes from a high-level to a low-level. A Q output terminal from the R-S flip-flop circuit (F/F) 29 produces an output signal $S_w$ having a constant high level during the transfer from, e.g., a set interval to a reset interval and having a constant low level during other states. The output signal $S_w$ from the Q output of the R/S flip-flop circuit 29 is sent to one input terminal of an OR gate circuit 45 and to an input terminal of a delay circuit 31. An output signal from the delay circuit 31 is sent to one input terminal of an OR gate circuit 47 and that of another OR gate circuit 48.

On the other hand, a focusing operation command signal $P_h$ from a focusing operation command signal generator 42 is sent to a set terminal S of another R-S flip-flop circuit (F/F) 43. A reset terminal R of the R-S flip-flop circuit 43 receives the output signal $P_s$ from the AND gate circuit 27. The Q output signal $S_h$ is sent to the other input terminal of the OR gate circuit 45 via an invertor 44.

In addition, control signals $C_r$, $C_f$, and $C_t$ are derived from respective output terminals of the OR gate circuits 45, 47, and 48. The control signal $C_r$ is sent to a control input terminal of the switch circuit 24, the control signal $C_f$ to a control input terminal of a switch circuit 32, the control signal $C_t$ to a control input terminal of another switch circuit 37.

A pair of selection contacts 32b and 32c of the switch circuit 32 receive an output signal from a phase compensation circuit 34 and a focusing voltage $V_{fo}$ from a focusing generation circuit 33. The phase compensation circuit 34 receives the output focus error signal $S_f$ from the signal forming circuit 20. An opposing fixed contact 32a is connected to a drive control circuit 35 which selectively receives the signal of either the focusing voltage $V_{fo}$ or focus error signal $S_f$.

The drive control circuit 35 actuates the focus adjustment actuation coil 12 according to the signal from either the focusing voltage $V_{fo}$ or phase compensation circuit 34.

It should be noted that the focusing voltage generator 33, switch circuit 32, drive control circuit 35, focus adjustment actuation coil 12, and control circuit for the switch circuit 32 constitute a focusing control section.

A pair of selection contacts 37b and 37c of the switch circuit 37 receives a traverse signal $T_t$, e.g., a sinusoidal signal having a frequency of 400 Hz from a traverse signal generator 38 and the output signal of the phase compensation circuit 39. The fixed contact 37a connected to a drive control circuit 40 via a switch circuit 41 receives either the traverse signal $T_t$ or the signal derived form the phase compensation circuit 39.

A drive control circuit 40 receives the output signal via the switch circuit 41 from the fixed contact 37a of the switch circuit 37. The switch circuit 41 receives the signal $P_t$ outputted with a predetermined level change from the focusing voltage generator 33 and is switched on during an interval over which the focusing operation is carried out. The drive control circuit 40 sends a drive signal according to a traverse signal $T_t$ or a signal from the phase compensation circuit 39 and actuates a tracking adjustment actuation coil 11. The traverse signal generator 38, switch circuits 37 and 41, drive control circuit 40, tracking adjustment actuation coil 11, and control sections for both switch circuits 37 and 41 constitute a traverse control section.

When the focus servo control operation is performed in the above-described construction, the focusing operation command signal $P_h$ is first outputted from the focusing operation command signal generator 42, thus the R-S flip-flop circuit 43 being set. The signal $S_h$ having a predetermined high level is at this time produced from the output terminal Q of the R-S flip-flop circuit 43. The signal $S_h$ is sent to the inverter 44 in which the level of the output signal is changed from the high level to the low level by means of the inverter 44. The inverted signal $S_h$ from the inverter 44 is sent to the other input terminal of the OR gate circuit 45. Since at this time the R-S flip-flop circuit 29 is not in the set state, the output signal $S_w$ from the Q output terminal is at a low level so that the output signal, i.e., the control signal $C_r$ derived from the OR gate circuit 45 having the predetermined low level is sent to the switch circuit 24. Consequently, the fixed contact 24a is connected to the selection contact 24b of the switch circuit 24 and the one input terminal (reference input terminal) of the level comparator 23 receives the reference voltage having the level $V_{r1}$ from the voltage source 25.

In addition, the signal $S_h$ from the R-S flip-flop circuit 43 is also sent to the delay circuit 36 and the reference voltage having a level of $V_{r1}$ is sent to the comparator 23.

Thereafter, the signal $S_h$ is sent to the focusing voltage generator 33 via the delay circuit 36. The signal $S_h$ is then sent to the two OR gate circuits 47, 48 via the inverter 46.

At this time, the focusing voltage generator 33 generates the focusing voltage $V_{fo}$. In addition, the output signal $S_w$ from the R-S flip-flop circuit 29 is at the low level, both output terminals of the OR gate circuits 47, 48 appear control signals $C_f$, $C_t$ having predetermined low levels.

The control signals $C_t$, $C_f$ are sent to respective control ends of the switche circuits 32, 37.

Consequently, the selection contact 32b is connected to the fixed contact 32a so that the drive control circuit 35 which actuates the focus adjustment actuation coil 12 according to the focusing voltage $V_{fo}$ from the focusing voltage generator 33.

Figure 4:
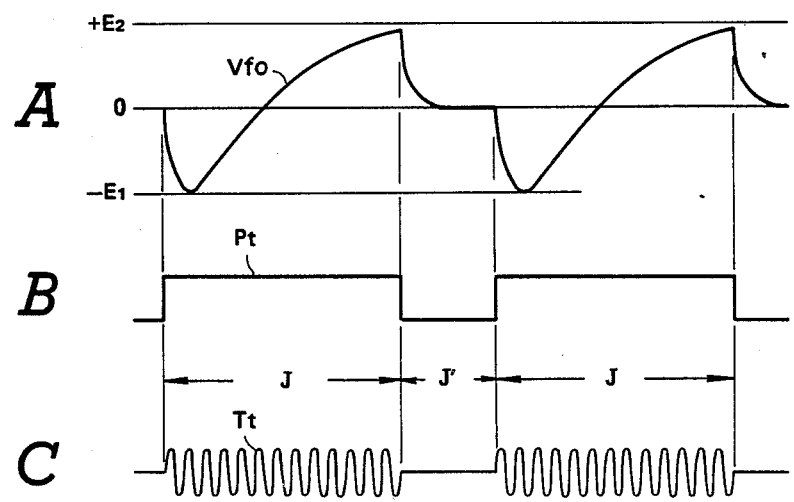
FIGS. 4 and 5 are waveform charts for explaining an operation of the embodiment shown in FIG. 1.

The focusing voltage $V_{fo}$, for example, changes its level from zero voltage level once abruptly to a negatively low level $-E_1$, gradually rises to a positively high level $+E_2$ passing through the zero voltage level, and drops to the zero voltage level, as shown in A of FIG. 4.

The focusing voltage $V_{fo}$ described above is sent to the drive control circuit 35 so that the focus control actuation coil 12 is operated on the basis of the focusing voltage $V_{fo}$. The focusing operation is started by means of the focusing control section. As the level of the focusing voltage $V_{fo}$ changes from zero level to a negative level $-E_1$, an objective lens 7 in the optical head 10 is once separated from the optical disc 1. Next, together with the change of the focusing voltage $V_{fo}$ from a negative low level $-E_1$ to a positive level $+E_2$, the objective lens 7 approaches the optical disc 1 along its optical axis direction, in such a way that the objective lens 7 changes from such a state as denoted by $\alpha$ in FIG. 3(A) to such a state as denoted by either $\gamma$ or $\delta$ in FIG. 3(A). Accordingly, a focused position of the incident laser beam on the optical disc 1 is changed from a position near the objective lens 7 separate from the signal recording surface (groove portion 52) of the optical disc 1 to the recording surface.

At the same time, the selection contact 37b is connected to the fixed contact 37a, the drive control circuit 40 which drives the tracking adjustment actuation coil 11 receives the traverse signal $T_t$, e.g., a sinusoidal signal having a frequency of 400 Hz from the traverse signal generator 38 via the switch circuit 41.

The signal $P_t$ is produced from the focusing voltage generator 33 having a contact high level during each focusing operation interval J based on the focusing voltage $V_{fo}$, as shown in B of FIG. 4, and having a constant low level during an interval J' defined by a time duration at a start time of which the focusing operation is once ended and at an end of which the focusing operation is newly started.

This signal $P_t$ is sent to the control terminal of the switch circuit 41 so that the switch circuit 41 is turned on during the interval J at which the signal $P_t$ is at the high level and the switch circuit 41 is turned off during the interval J' at which the signal $P_t$ is at the low level.

As shown in C of FIG. 4, the traverse signal $T_t$ is sent to the drive control circuit 40 only during the interval for which the focusing operation is carried out.

The traverse signal $T_t$ is sent to the drive control circuit 40 so that the tracking adjustment actuation coil 11 is operated on the basis of the traverse signal $T_t$. Consequently, the traverse operation is performed so that the objective lens 7 in the optical head 10 traverses the land portion 51 and groove portion 52 of the optical disc 1 according to the traverse signal $T_t$. The objective lens 7 reciprocates over a constant range in distance defined according to an amplitude of the traverse signal $T_t$. As shown in B of FIG. 3, the incident laser beam which arrives at the signal recording surface (groove portion 52) of the incident laser beam is moved toward a direction for the incident laser beam to traverse across the high-reflectivity portion (land portion 51). A spot $B_s$ of the incident laser beam on the signal recording surface (groove portion 52) and on the high-reflectivity portion (land portion 51) moves in a zig-zag fashion as appreciated from FIG. 3(B).

In this way, when the focusing operation and traverse operation are simultaneously performed, the focused position of the incident laser beam on the optical disc 1 moves in a direction across the land and groove portions 51, 52. Consequently, the focused position of the incident laser beam is moved from a position near the objective lens 7 to a position on parts of the land and groove portions 51, 52.

Figure 3A:
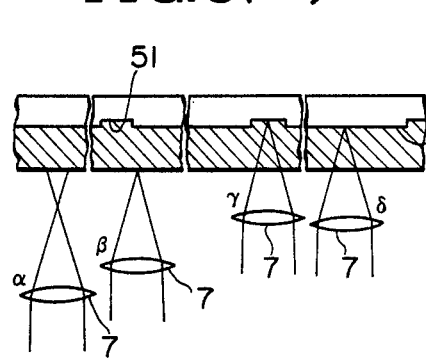
FIGS. 3(A) and 3(B) are explanatory views for explaining focusing and traversing operations in the preferred embodiment shown in FIG. 1.
Figure 3B:
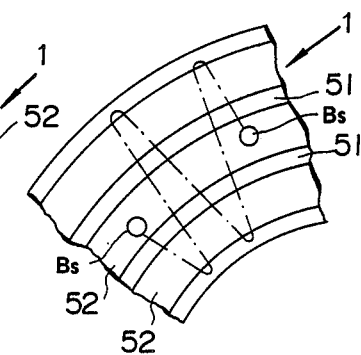

As shown in $\alpha$ of FIG. 3(A), when the focused position is placed toward the objective lens 7 of the optical disc 1, i.e., the focused position is placed at a location nearer to the objective lens 7 than to the outer surface of the optical disc 1. At this time, the signal $S_{se}$ to be sent to the one input terminal of the level comparator 23 holds the low level $L_1$ as shown in A of FIG. 5. Since the low level $L_1$ of the signal $S_{se}$ is lower than the level $V_{r1}$ of the reference voltage from the voltage source 25, the comparison output $C_c$ derived from the level comparator 23 forms a low level output as shown in B of FIG. 5.

Figure 5:
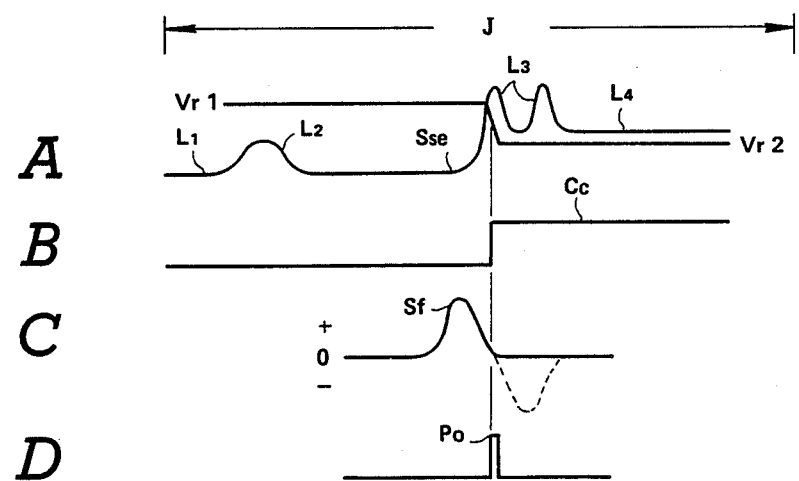

Next, when the focused position of the incident laser beam is placed on the outer surface of the optical disc 1, the level of the signal $S_{se}$ produces a level incremental portion $L_2$ as shown in A of FIG. 5. However, the level incremental portion $L_2$ does not exceed the level $V_{r1}$ of the reference voltage. When the focused position of the incident laser beam advances toward the inner side of the optical disc 1 and reaches the land portion 51 having the high reflectivity as shown in γ of FIG. 3(A), i.e., the focused position is placed on the just focus state concerning the land portion 51, the signal $S_{se}$ takes the high level state $L_3$ exceeding the level $V_{r1}$ of the reference voltage. Consequently, the comparison output $C_c$ from the level comparator 23 takes a high level state at the same time when the level of the signal $S_{se}$ exceeds the level $V_{r1}$ and the high-level signal $C_c$ from the level comparator 23 is sent to one input terminal of the AND gate circuit 27.

At this time, the focus error signal $S_f$ sent to the zero crossing detection circuit 26 changes from the positive level to the zero level, e.g., as shown in C of FIG. 5 as the focused state of the land portion 51 of the optical disc 1 is transferred from the over focus state to the just focus state. Thereafter, when the focus error signal $S_f$ indicates zero level, a pulse $P_o$ is derived as shown in D of FIG. 5 from the zero crossing circuit 26, the pulse $P_o$ is sent to the other input terminal of the AND gate circuit 27. Therefore, a pulse $P_s$ corresponding to the pulse $P_o$ is derived from the AND gate circuit 27 and the R-S flip-flop circuit 29 is set in response to the pulse $P_s$ from the AND gate circuit 27. When the output signal $S_w$ from the Q output terminal of the R-S flip-flop circuit 29 is turned to the high level and sent to the one input terminal of the OR gate circuit 45. The high-level output signal $S_w$ of the R-S flip-flop circuit 29 is also sent to the one input terminals of the two OR gate circuits 47, 48 via the delay circuit 31. Consequently, the control signals $C_r$, $C_f$, and $C_t$ become high level states and are sent to the control ends of the switch circuits 24, 32, and 37, respectively.

Therefore, the level of the reference voltage sent to the reference input end of the level comparator 23 from the voltage source 25 with the fixed contact 24a connected to the selection contact 24c is changed from the level $V_{r1}$ to the other predetermined level $V_{r2}$ lower than the level of the signal $S_{se}$ derived when the incident laser beam is in the just focus state or in a state approximate to the just focus state on the groove portion 52 as the signal recording surface of the optical disc 1. In addition, the fixed contact 37a is connected to the selection contact 37c in the switch circuit 37 after the level of the reference voltage to be sent to the reference input terminal of the level comparator 23 is changed to the level $V_{r2}$ so that the drive control circuit 40 receives the output signal of the phase compensation circuit 39 which is derived from the tracking error signal $S_t$ in place of the traverse signal. Furthermore, the fixed contact 32a is connected to the selection contact 32c in the switch circuit 32 after the level of the reference voltage to be sent to the reference input terminal of the level comparator 23 is changed to the level $V_{v2}$ so that the drive control circuit 35 receives the output signal of the phase compensation circuit 34 which is derived from the focus error signal, in place of the focusing voltage $V_{fo}$. Consequently, the tracking adjustment actuation coil 11 is operated on the basis of the tracking error signal $S_t$. Consequently, the tracking servo control operation is performed in which the incident laser beam scans accurately on the groove portion 52, i.e., signal recording surface of the optical disc 1 and maintains its accurate scanning operation. At the same time, the focus adjustment actuation coil 12 is operated on the basis of the focus error signal $S_f$ and the focus servo control is performed in which the position of the objective lens 7 in the optical head 10 is controlled so that the incident laser beam maintains its just focus state on the groove portion 52, i.e., the signal recording surface of the optical disc 1.

In this way, when the incident laser beam has just been focused on the land portion 51 of the optical disc 1, the above-described detection section detects that the focused position of the incident laser beam is placed in the vicinity of the groove portion 52 of the signal recording surface of the optical disc 1, i.e., in a predetermined focusing range including the land portion 51. At this time, control mode is changed from the focusing operation mode to the focus servo control mode in which the focused position of the incident laser beam is adjusted according to the focus error signal $S_f$. When the incident laser beam is placed in the just focused state on the land portion 51 having the relatively high reflectivity, the control is transferred to the focus servo control upon completion of the focusing operation.

After the mode transfer from the focusing operation to the focus servo control operation, the signal $S_{se}$ from the envelope detector 22 is once turned to the high level $L_3$ as shown in A of FIG. 5 and thereafter is maintained at the level incremental state $L_4$ which is derived when the incident laser beam is placed in the just focus state on the groove portion 52 of the recording surface of the optical disc 1. The level incremental state $L_4$ is an intermediate level between the levels $V_{r1}$ and $V_{r2}$ from the voltage source 25.

Since at this time the reference voltage to be sent to the reference input terminal of the level comparator 23 has a level of $V_{r2}$, the comparison output signal $C_c$ derived from the level comparator 23 maintains at the high level as shown in B of FIG. 5.

If the focusing position is deviated from the range within which the focus servo control is correctly made due to some cause during the focus servo control, the signal $S_{se}$ from the envelope detector 22 becomes lower than the level $V_{v2}$ of the reference voltage applied to the reference input terminal of the level comparator 23. Consequently, the comparison output signal $C_c$ from the level comparator 23 falls to the low level when the level of the signal $S_{se}$ becomes lower than the level $V_{r2}$. Consequently, the comparison output signal $C_c$ of the level comparator 23 is turned to the low level when the level of the signal $S_{se}$ becomes lower than the level $V_{r2}$. The falling edge of the comparison output $C_c$ is detected by the signal falling edge detector 28 so that the pulse $P_r$ is produced at the output terminal of the signal falling edge detector 28. The signal falling edge detector 28 comprises, e.g., an inverter and a monostable multivibrator which output the pulse $P_r$ whenever the level of the input signal falls to the low level. The pulse $P_r$ is sent to the reset terminal R of the R-S flip-flop circuit 29, thus the output signal $S_w$ of the R-S flip-flop circuit 29 is turned to the low level. Consequently, the switch circuit 24 switches again the reference voltage of the level $V_{r1}$ to be sent to the reference input terminal of the level comparator 23. In addition, the switch circuits 32 and 37 are switched to send the focusing voltage $V_{fo}$ to the drive control circuit 35 and to send the traverse signal $T_t$ to the drive control circuit 40, respectively. Consequently, the above-described focusing operation and traverse operation are again carried out.

As the result of the above-described traverse operation, the laser beam traverses the land portion 51 having the high reflectivity of the optical disc 1 during the focusing operation so that the laser beam is placed in the just focused state on the land portion 51. This is accurately detected by means of the above-described detection section. Hence, the detection section accurately detects that the focused position of the incident laser beam is in the vicinity of the groove portion 52 of the signal recording surface of the optical disc 1, i.e., within the predetermined focusing range including the focused state on the land portion 51. Consequently, an appropriate focusing operation is carried out and the change from the focusing operation state to the focus servo control state is smoothly made at an appropriate timing.

As described hereinabove, since the optical disc player according to the present invention carries out the traverse operation during the focusing operation when the writable optical disc is used having the signal recording surface of relatively low light reflectivity and which is formed with the partition of the high reflectivity portion formed spirally or concentrically, the player can accurately detect that the focused position of the incident laser beam on the disc during the focusing operation is placed just on the signal recording surface or in the vicinity thereof. Hence, the appropriate focusing operation can be assured. The change from the focusing operation state to the focus servo control state in which the focused position of the incident laser beam on the optical disc is adjusted on the basis of the focus error signal is carried out at an appropriate timing. Consequently, an accurate focus servo control can be made for an optical disc having a recording surface of a relatively low light reflectivity.

It will clearly be understood by those skilled in the art that the detailed description was made in terms of the preferred embodiment and various changes and modifications are made without departing from the scope of the present invention which to be defined by the appended claims.

What is claimed is:

1. An optical disc player for playing an optical disc adapted to have information recorded thereon and having a surface with radially separated high light reflectivity and relatively low light reflectivity portions, said optical disc player being adapted to perform an initial focusing operation prior to recording and/or readout and comprising:

a focusing operation command means for setting the initial focusing operation;

first means for generating and emitting a light beam;

second means having a focal point at a predetermined distance therefrom for focusing the light beam emitted from said first means toward said optical disc;

third means for detecting the light beam reflecting from the optical disc and generating a first signal indicating said information and a second signal indicating a focused state of the light beam on the optical disc through said second means fourth means responsive to said focus operation command means for traversing the light beam incident on the optical disc through said second means across the high light reflectivity portion in a direction parallel to said surface of the optical disc during said initial focusing operation;

fifth means responsive to said focus operation command means for controlling movement of said second means during said initial focusing operation along a light axis of the light beam so as to place focused position of the light beam through said second means within a predetermined focusing capture range;

sixth means for controlling movement of said second means along the light axis of the light beam so as to adjust the focused position of the light beam through said second means in response to the second signal from said third means;

seventh means for detecting during said initial focusing operation in response to the first and second signals that the focused position of the light beam through said second means is placed within the predetermined focusing capture range; and eighth means for switching the control of movement of said second means from said fifth means to said sixth means in response to the detection that said focused position of the light beam is within said focusing capture range to end said initial focusing operation;

wherein said seventh means includes envelope detector means for detecting an envelope signal of the first signal from said third means, signal generating means for generating two reference signals having different voltage levels, and comparator means for comparing an output of the envelope detector means with a selected one of the two reference signals.

* * * * *